(12) United States Patent
Burchell et al.

(10) Patent No.: US 9,169,086 B1
(45) Date of Patent: Oct. 27, 2015

(54) AIR CONVEYOR

(71) Applicants: Victor Howard Burchell, York, PA (US); James Harper Moffitt, York, PA (US)

(72) Inventors: Victor Howard Burchell, York, PA (US); James Harper Moffitt, York, PA (US)

(73) Assignee: SEETECH Systems, Inc., York, PA (US)

( * ) Notice: Subject to any disclaimer, the term of this patent is extended or adjusted under 35 U.S.C. 154(b) by 0 days.

(21) Appl. No.: 14/273,579

(22) Filed: May 9, 2014

Related U.S. Application Data

(60) Provisional application No. 61/821,376, filed on May 9, 2013.

(51) Int. Cl.
*B65G 53/00* (2006.01)
*B65G 51/02* (2006.01)

(52) U.S. Cl.
CPC ..................... *B65G 51/02* (2013.01)

(58) Field of Classification Search
USPC ....................................................... 406/19, 88
See application file for complete search history.

(56) References Cited

U.S. PATENT DOCUMENTS

| | | | | |
|---|---|---|---|---|
| 4,822,214 A | * | 4/1989 | Aidlin et al. | 406/86 |
| 6,190,094 B1 | | 2/2001 | Rediess et al. | |
| 6,685,401 B1 | * | 2/2004 | de Almeida Rodrigues et al. | 406/11 |
| 2002/0192038 A1 | * | 12/2002 | Trenel et al. | 406/88 |
| 2002/0192093 A1 | * | 12/2002 | Gantenhammer | 418/48 |

* cited by examiner

*Primary Examiner* — Joseph Dillon, Jr.
(74) *Attorney, Agent, or Firm* — Hooker & Habib, P.C.

(57) ABSTRACT

An air conveyor segment for conveying articles along a conveyor path includes a main air duct extending the length of the segment and a wall dividing the air duct into upper and lower air ducts. The wall includes an opening that extends the length of the main air duct. A valve assembly includes a valve member attached to the wall that opens and closed the wall opening to regulate the speed of articles being conveyed along the conveyor segment.

18 Claims, 5 Drawing Sheets

AIR CONVEYOR

FIELD OF THE DISCLOSURE

This disclosure relates to air conveyors or pneumatic conveyor apparatus for conveying articles, and in particular to air conveyors or pneumatic conveyor apparatus for transporting hollow articles such as preforms, bottles, and containers.

BACKGROUND OF THE DISCLOSURE

Air conveyors utilize air discharge pressurized air from a flow duct. The air is directed against a container, such as a newly manufactured plastic bottle, to move the bottle along a path. The bottle itself is typically suspended between a pair of guides that support a neck ring formed on the bottle. The guides locate the top of the bottle inside a "U"-shaped channel. The legs of the channel include openings that discharge air directed against the bottle tops. The guides enable the bottles being pushed by the airflow to slide along the guides and move along a conveyor path.

A fan or blower supplying pressurized air to the conveyor duct controls the speed at which the bottles move along the guides. A variable-frequency drive acting on the blower motor controls the pressure and velocity of the air supplied from the blower (the motor is typically a 3 HP electric motor). Increasing motor speed increases conveyor speed, and decreasing motor speed decreases conveyor speed.

At times it is desirable to stop the movement of bottles along the conveyor path. Bottles upstream of the stopped bottles, however, may continue moving and impact against the stopped bottles, denting or otherwise permanently deforming the bottles. Such deformed bottles may be visually unacceptable and may affect downstream process and filling operations. Furthermore, severe damage may even "lock" the bottle to the guide rails and prevent upstream bottles from resuming movement until the locked bottle is removed.

To reduce impact damage, conveyor airflow is limited to reduce bottle speed and match bottle speed with the physical characteristics and material properties of the bottle. Some bottles however, such as paper-thin water bottles or high-density containers having little intrinsic strength, are prone to denting using conventional air conveyors.

Trenel et al. Patent Application Publication 20020192038 discloses an air conveyor in which the conveyor air duct is divided by a wall into upper and lower duct compartments. The upper duct compartment receives pressurized air from the blower. The lower duct compartment provides the pressurized air to the channel for discharge against the bottles.

An opening in the wall near an end of the duct fluidly communicates the upper duct compartment with the lower duct compartment. A flat plate acts as a valving member that opens and closed the opening. When the opening is closed, the lower duct compartment is isolated from the upper duct compartment, stopping the flow of air through the channel and stopping the flow of bottles.

Use of a plate to close an opening near an end of the duct does not allow fine control of air flow. The plate when away from the opening itself acts to subdivide the upper duct compartment, with the result that the plate may impart unwanted turbulence to the airflow. Being near an end of the duct, the control of airflow at the other end of the duct is not optimum.

Rediess et al. U.S. Pat. No. 6,190,094 discloses an air conveyor in which a cap can be selectively raised or lowered over the channel to provide high-speed or low-speed airflow. When the cap is raised, airflow into the channel is unobstructed and the air discharges from the channel at relatively high speed. When the cap is lowered, the cap partially obstructs the channel openings, reducing airflow to relatively low-speed airflow.

Modifying the Rediess et al. air conveyor to shut off airflow is expensive since the cap would need to fit closely over the channel. Using different channels for different bottles or containers would require changing caps, adding additional expense.

Thus there is a need for an air conveyor that can better regulate airflow for controlling the speed of articles being conveyed by the air conveyer.

BRIEF SUMMARY OF THE DISCLOSURE

Disclosed is an air conveyor that better regulates airflow for controlling the speed of articles being conveyed by the air conveyor.

The air conveyor may include one or more segments that extend along the conveyer path. Each air conveyor segment includes a first end and an opposite second end spaced from the first end. A main air duct extends from the first end to the second end, with a first wall in the duct separating the main air duct into an upper air duct and a lower air duct extending the length of the main air duct. A through opening in the first wall extends the length of the main air duct and fluidly communicates the upper air duct and the lower air duct.

Openings in the lower air duct are formed in a channel forming part of the lower air duct, the channel extending from the first end to the second end. The channel has a hollow interior open to the ambient atmosphere and openings in the channel that fluidly communicate the interior of the channel with the lower air duct.

A valve assembly selectively opens and closes the wall opening, the valve assembly including a first valving member attached to the wall and movable between opened and closed positions.

The disclosed air conveyor has a number of advantages. Because the opening between the upper and lower air ducts preferably extends the length of the segment, airflow from the upper duct into the lower duct is smoother and less turbulent. The valving member is attached to the wall dividing the air ducts so does not act to stratify the upper air duct when the valving member is in its opened position.

In possible embodiments of the air conveyor the valve assembly may me operated to only partially open the opening to selectively regulate airflow speed and thereby regulate article conveying speed.

Air conveyors formed from multiple air conveyor segments also have a number of advantages. Article conveying speed can be adjusted between segments for better control of the distribution of articles along the conveyor path. For example, a downstream segment may be closed, with articles stopped along that segment of the conveyor path. An upstream segment can be then partially closed to slow article speed so that any impacts of upstream articles with the stopped articles does not result in impact damage to the articles. Downstream segments could be opened before upstream segments to restart movement of articles along the conveyor.

In a preferred embodiment of the air conveyor segment, the valving member is attached to a hinge and pivots from the closed position into the upper air duct to the opened position. Because the channel is spaced from the valve assembly, the channel can be replaced with a different-sized channel for conveying different bottles or containers without affecting operation of the valve assembly.

In yet a further preferred embodiment of the air conveyor segment, the wall includes a second opening like the first opening, and the valve system includes a second valving member that opens and close the second opening. The first and second openings are located on opposite sides of the channel for smooth airflow to both sides of the channel.

Other objects and features of the disclosure will become apparent as the description proceeds, especially when taken in conjunction with the accompanying drawing sheets.

DETAILED DESCRIPTION

FIGS. 1-4 illustrate an air conveyor segment 10 used for conveying a number of bottles B. The bottles B are shown for illustrative purposes only.

Figure 2:
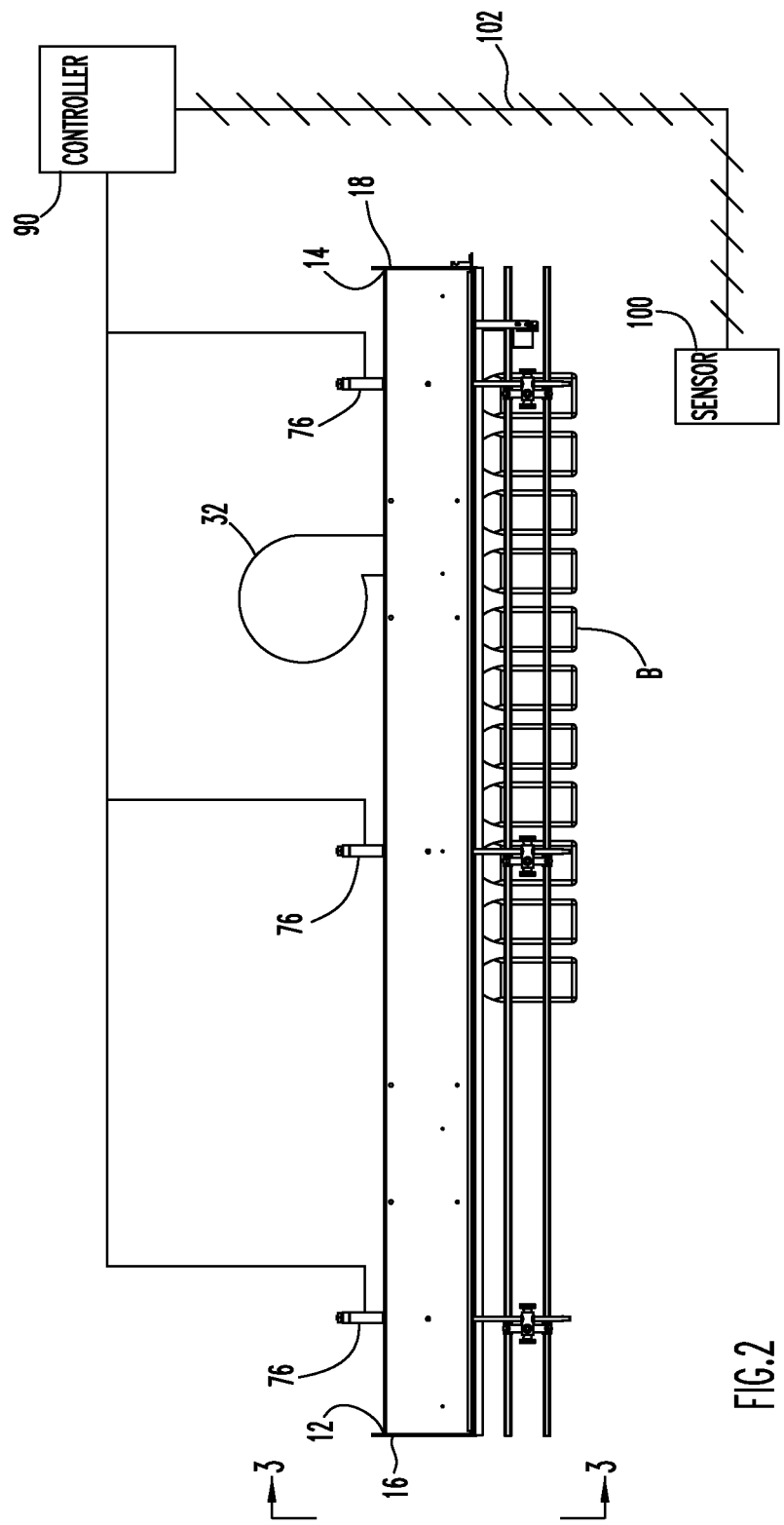
FIG. 2 is a side view of the air conveyor segment shown in FIG. 1.
Figure 3:
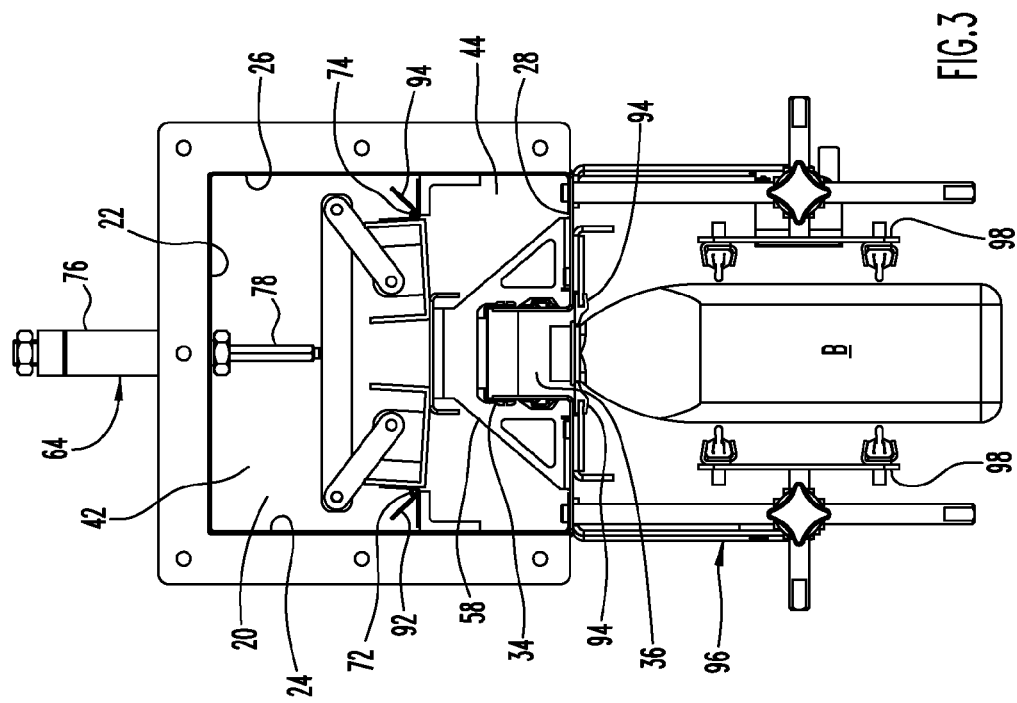
FIG. 3 is an end view of the air conveyor segment taken along lines 3-3 of FIG. 2, the valve system in the closed position.
Figure 4:
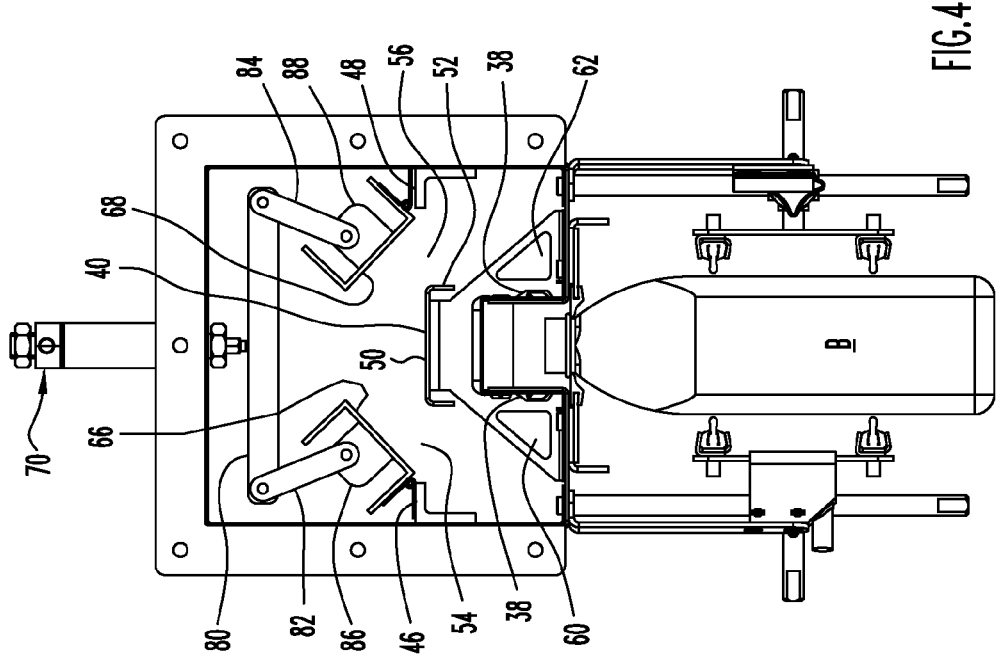
FIG. 4 is similar to FIG. 3 but with the valve system in the opened position.

The air conveyor segment 10 extends between axially opposite segment ends 12, 14 and is configured to be placed end-to-end with adjacent like or similar air conveyor segments 10 to form an air conveyer line for conveying bottles along a conveyor path represented by the line 15 in FIG. 2 between an intake location (not shown) and a discharge location (not shown). Face frames 16, 18 located on opposite ends of the conveyor segment 10 include mounting holes for fastening adjacent conveyor segments together.

The illustrated air conveyor segment 10 extends along a straight-line conveyor path, but other similar conveyor segments may extend along a circular or other arcuate path.

The air conveyor segment 10 includes a main air duct 20 that extends the length of the conveyor segment 10 between the segment ends 12, 14. The main air duct 20 is generally rectangular in cross-section and is bounded by an upper wall 22, a pair of side walls 24, 26, and a bottom wall 28.

The upper wall 22 includes a pair of spaced-apart openings 30 that enable the air duct 20 to receive pressurized air from a fan or blower 32 (shown schematically in FIG. 2). The number of blowers 32 used on an air conveyor line, the spacing of the blowers 32, and the number of conveyor segments 10 supplied depends on the length of the air conveyor line, the airflow needs, the blowers used, the types of articles being conveyed, and other engineering considerations as is known in the air conveying art.

In some air conveyor lines, one or more of the blower openings 30 may not receive pressurized air directly from a blower. A removable cover 32 closes an unused blower opening 30.

A U-shaped channel 34 forms a portion of the bottom wall 28 and extends the full length of the main air duct 20. The channel is centered between the side walls 24, 26 and has a hollow interior 36 facing away from the duct 20, with through-openings spaced along the legs of the channel 30. The openings 38 fluidly communicate the exterior of the channel 34 with the interior 36 and are configured to flow air flowing into the opening 38 in a downstream direction along the channel 30.

An intermediate wall 40 in the main air duct 20 extends the length of the conveyor segment 10. The wall 40 is spaced from the upper and lower walls 22, 28 and divides the main air duct 20 into an upper air duct 42 and a lower air duct 44. The upper air duct 42 receives pressurized air from the one or more blowers 32. The exterior of the channel 34 faces the lower air duct 44 with the channel openings 38 fluidly communicating the lower air duct 40 with the channel interior 32.

The intermediate wall 40 is formed by a leg 46 and a leg 48 of L-shaped channels attached to respective side walls 24, 26 and a flat side 50 of a U-shaped channel 52 centered between the walls 24, 26. The channel 52 is spaced away from the legs 46, 48 to define a first wall opening 54 between the leg 46 and the channel 50 and a second wall opening 56 between the leg 48 and the channel 52. Each opening 54, 56 extends the full length of the main air duct 20 and fluidly communicates the upper air duct 42 with the lower air duct 44.

In the illustrated embodiment, the channel 52 is supported on brackets 58 in the lower air duct 44. The brackets 58 are spaced along the length of the duct 44 and are mounted on the channel 34. Each bracket 58 is shaped as a truncated triangle having an opening to receive the channel 34. The portions of the bracket 58 extending away from opposite sides of the channel 34 have respective through-openings 60, 62 for air flow through the bracket 58.

A valve formed as a valve assembly 64 selectively opens and closes the wall openings 54, 56 to fluidly communicate and fluidly isolate the upper air duct and the lower air duct. The valve assembly 64 includes a pair of movable valving members 66, 68 and a drive mechanism 70 that selectively moves the valving members 66, 68 between respective opened positions shown in FIG. 3 and closed positions shown in FIG. 4.

Each valving member 66, 68 is formed as a "U" shaped channel that extends the length of the duct 20. The drive 70 includes a hinge 72 attached to and extending the length of the leg 46 and a hinge 74 attached to and extending the length of the leg 48. The valving member 66 is attached to the hinge 72 for pivotal movement between opened and closed positions, with the flat side of the channel 66 spanning the opening 54 when the valving member 66 is in the closed position. The valving member 68 is attached to the hinge 74 for pivotal movement between opened and closed positions, with the flat side of the channel 68 spanning the opening 56 when the valving member 68 is in the closed position.

The drive 70 further includes a number of spaced-apart double-acting fluid cylinders 76 mounted on the outside of the top wall 22. The illustrated cylinders 76 are pneumatic cylinders.

A piston rod 78 extends from each cylinder 76, through the top wall 22, and into the upper air duct 42. Each piston rod 78 is attached to a cross arm 80 that pivotally mounts one end of respective link arms 82, 84 on opposite ends of the arm 80. The other end of each link arm 82, 84 is pivotally connected to a respective bracket 86, 88 attached to a respective valving member 66, 68.

Figure 1:
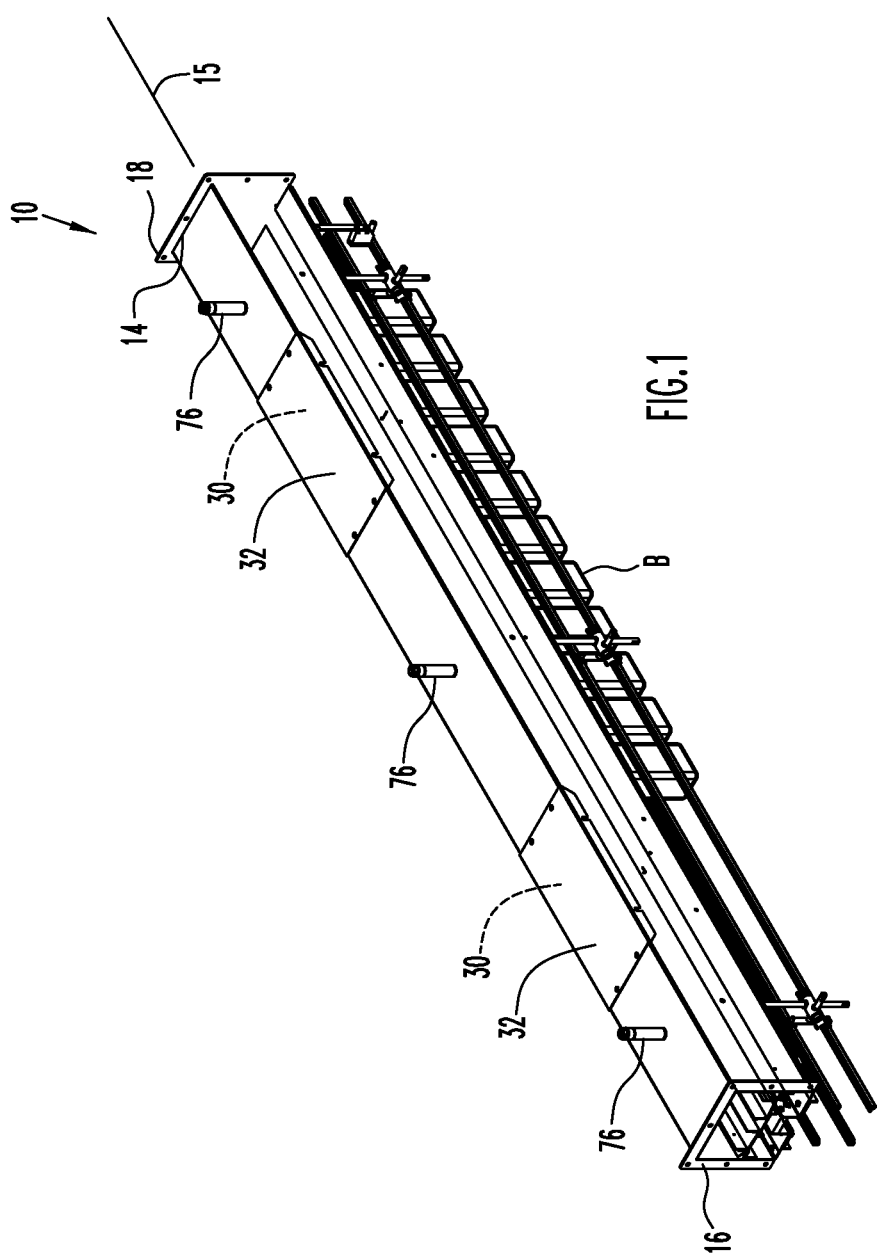
FIG. 1 is a perspective view of an air conveyor segment.

The drives 70 are preferably operated by a control system 90 shown schematically in FIG. 1. The fluid cylinders 76 simultaneously drive the piston rods 78 between extended positions shown in FIG. 3 and retracted positions shown in FIG. 4 to move the valving members 66, 68 between closed and opened positions. The wall 50 is in the path of the valving members 66, 68 so extension of the piston rods 78 press the valving members 66, 68 against the wall 50 to place the valving members 66, 68 in their closed positions and close the wall openings 54, 56.

Each hinge 72, 74 includes a respective stop member 92, 94 that pivotally rotates with the valving member attached to the hinge with a respective leg 46, 48 in the path of movement of the stop member as the valving member moves towards its opened position. The stop member 92, 94 presses against the respective leg 46, 48 to resist further movement of the valving member, thereby defining the opened positions of the valving members 66, 68 with retraction of the piston rods 78.

Mounted to the lower wall 28 outside of the duct 20 are two facing neck guides 94 that extend the length of the segment 10. The neck guides 94 are spaced apart from one another and have opposing guide profiles configured for supporting the neck ring of a bottle B between them, with the top of the bottle extending into the chamber interior 36. An adjustable bottle guide 96 extends from the segment 10 and includes a pair of fences 98 that engage opposite sides of the bottles B to maintain bottle alignment. The neck guides 94 and bottle guide 96 are conventional and so will not be described in further detail.

Operation of the air conveyor segment 10 is described next. When the control system 90 determines that it is desired to move the bottles B along the bottle path defined by the air conveyor segment 10, the fluid cylinders 76 are actuated to retract the piston rods 78 and place the valving members 66, 68 in their opened positions. Pressurized air in the upper air duct 42 communicates through the openings 54, 56 with the lower air duct and the openings 38 in the channel 34. The channel 34 is centered between the openings 54, 56 for the uniform and balanced discharge of air through the openings 38 on both sides of the channel 34.

Pressurized air in the lower air duct 44 flows through the channel openings 38 and into the channel interior 36, urging the bottles B held by the guides to move in the downstream direction.

When the control system 90 determines that it is desired to stop movement of bottles B along the bottle path defined by the air conveyor segment 10, the fluid cylinders are actuated to extend the piston rods and place the valving members in their closed positions. The upper air duct 42 is now fluidly disconnected from the lower air duct 44, and the lower air duct 42 quickly reaches atmospheric pressure, stopping the flow of air through the channel openings. Preferably the manufacturing tolerances and operating parameters used in the manufacture and operation of the air conveyor segment 10 is such that any air leakage from the upper air duct 42 to the lower air duct 44 when the valving members are closed is insufficient to provide air that can flow the bottles B. The bottles B held by the guides come to rest.

The control system 90 may be connected to a control or sensor 100 (see FIG. 1) that informs the control system 90 via a data signal 102 about the status of the bottles being conveyed along the conveyor path 15, and whether to maintain or adjust the flow of bottles along the segments of the conveyor path. The control system 90 may be connected to a sensor network that includes a number of sensors 100 that monitor bottle speed, bottle density, or the like.

The sensors 100 are conventional and so won't be described in detail; sensors 100 may monitor the flow of bottles B throughout the conveyor system, with the control system 90 programmed to automatically actuate and operate the valve assemblies 64 along the conveyor path 15 in response to the network data signals 104 to control the speed and position of bottles along the entire conveyor path.

The control system 90 may also be designed to selectively move the piston rods 78 between extended and retracted positions so as to selectively partially open the openings 54, 56 to adjust the speed of bottles conveyed along the segment between a maximum speed when the valving members 66, 68 are in their opened positions and being stopped when the valving members 66, 68 are in their closed positions. The position of the piston rods 78 may be controlled automatically by the control system 90 to stop, slow, or increase the speed of bottles B along different segments of the conveyor path 15 in response to the data signals 102. The valve assembly 64 acts to move the valving members 66, 68 in unison for uniform air flow through the openings 54, 56 to the openings 39 on both sides of the channel 34 even when partially opened.

A given air conveyor segment 10 may have its valving members 66, 68 in different positions than do the valving members of adjacent upstream or downstream segments 10. For example, the control system 90 may sequentially close the segments 10 along the conveyor path 15 to stop downstream bottles and slow upstream bottles. The control system 90 may sequentially open the segments 10 along the conveyor path 15 to begin moving downstream bottles before moving upstream bottles. Other combinations may be possible depending on the programming of the control system 90.

Figure 5:
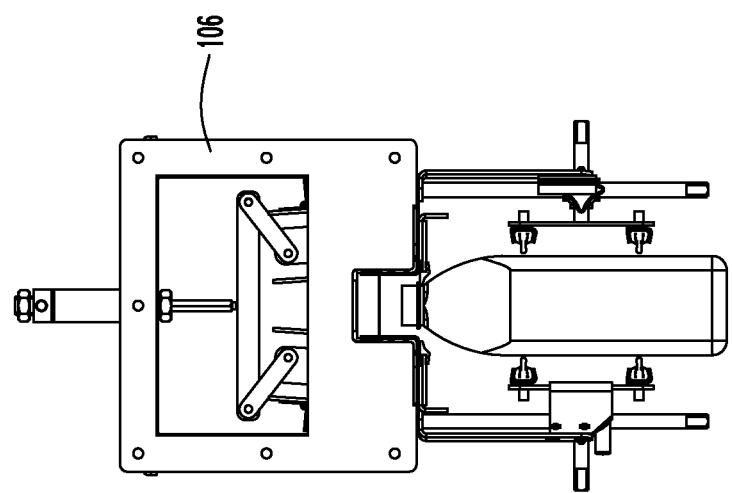
FIG. 5 is similar to FIG. 3 but illustrates the air conveyor segment being an end segment of a fan segment.

A number of air conveyor segments 10 may be joined end-to-end along the conveyor path 15 to define a fan segment that is supplied pressurized air from a respective blower 34. The face frames 16, 18 at the ends of the fan segment and adjacent the other fan segments may be formed as a segment end frame 104 shown in FIG. 5. The end frame 104 blocks the main air duct 20 between fan segments and fluidly separates the main air ducts 20 between fan segments. This prevents a blower 34 from pressuring fan segments.

Figure 6:
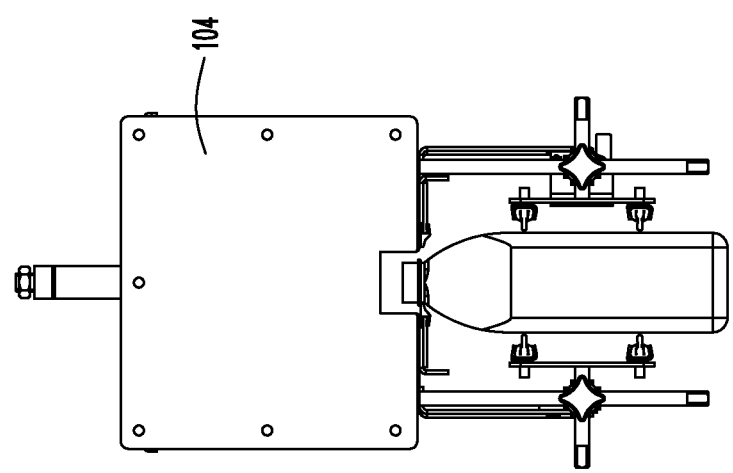
FIG. 6 is similar to FIG. 3 but illustrates the air conveyor segment being an intermediate segment of a fan segment.

The face frames 16, 18 of air conveyor segments 10 between the frames 104 may be formed as intermediate frames 106 shown in FIG. 6. The intermediate end frame 106 blocks the lower air duct 44 between adjacent air conveyor segments 10. This prevents air flow between adjacent lower air ducts 44 so that the lower air duct 44 of a conveyor segment 10 whose valve members are closed cannot receive pressurized air from the lower air ducts of upstream or downstream conveyor segments 10 whose valve members are not closed.

In other possible embodiments of the air conveyor segment 10, additional valve members may be provided to selectively flow air from the upper air duct 42 against the bottles B urging the bottles in an upstream direction when the valve system 64 is closed. An example of such a reverse flow system that can be adapted for use with the conveyor segment 10 is disclosed in Trenel et al. Patent Application Publication 2002/0192038.

In yet other possible embodiments of the air conveyor segment, the valving members 66, 68 may be mounted for rotation about a common axis to move the valving members 66, 68 between opened and closed positions. One valving member, for example, may rotate into the upper air duct 42 and the other valving member rotate into the lower air duct 44 when moving to their respective opened positions.

In yet other possible embodiments of the air conveyor segment, the intermediate wall 48 may be formed with more or less openings communicated the upper and lower air ducts, and the opening or openings may include a number of spaced apart openings extending along the length of the segment rather than being a continuous opening.

In yet further possible embodiments an air conveyor line may be formed from a single air conveyor segment, that is, the ends of the air conveyor line are also the ends of the air conveyor segment.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

The invention claimed is:

1. An air conveyor segment comprising:
   a first end and an opposite second end spaced from the first end;
   a main air duct extending from the first end to the second end;
   a conveyance surface being disposed adjacent to the main air duct and extending from the first end to the second end of the main air duct;
   a first wall extending from the first end to the second end, the first wall in the main air duct and separating the main air duct into an upper air duct and a lower air duct, a first wall opening in the first wall extending from the first end to the second end, the first wall opening fluidly communicating the upper air duct and the lower air duct;
   the main air duct comprising an outer wall defining a portion of the upper air duct, the outer wall comprising at least one opening extending through the outer wall and opening into the upper air duct, each at least one outer wall opening fluidly communicating the upper air duct with a source of pressurized air when a source of pressurized air supplies pressurized air through the opening and into the upper duct;
   a plurality of openings in the lower air duct away from the first wall, the plurality of openings in the lower air duct fluidly communicating the lower air duct with the ambient atmosphere and being disposed to impinge air flowing therethrough to the ambient atmosphere against the conveyance surface, and
   a valve assembly configured for selectively opening and closing the first wall opening, the valve assembly comprising a first valving member attached to the first wall and being movable between opened and closed positions, the first valving member closing the first wall opening when in the closed position, the first wall opening being open when the first valving member is in the opened position; and
   the first valving member being pivotally mounted to the first wall for movement between opened and closed positions.

2. The air conveyor segment of claim 1 wherein the first wall opening is disposed between adjacent side portions of the first wall and the valve assembly further comprises a hinge mounted on one side portion of the first wall pivotally mounting the first valving member to the first wall, the first valving member spanning the first wall opening when in the closed position.

3. The air conveyor segment of claim 2 including a stop member attached the first valving member, the stop member configured and disposed to make contact with the first wall and resist further movement of the first valving member past the opened position when the first valving member is moving towards the opened position.

4. The air conveyor segment of claim 1 comprising one or more fluid cylinders connected to the first valving member, the one or more fluid configured and disposed to drive the first valving member between said opened and closed positions.

5. The air conveyor segment of claim 4 wherein each fluid cylinder comprises a piston rod extending into the upper air duct and not extending into the lower air duct.

6. The air conveyor segment of claim 1 comprising a removable cover closing at least one of the said at least one outer wall opening.

7. The air conveyor segment of claim 1 wherein at least one of the said at least one outer wall opening in the second wall is fluidly connected to a source of pressurized air.

8. The air conveyor segment of claim comprising a second wall opening in the first wall fluidly communicating the upper air duct and the lower air duct, the second wall opening extending from the first end to the second end and spaced from the first wall opening, the valve assembly comprising a second valving member being pivotally mounted to the first wall for movement between opened and closed positions, the second valving member closing the second wall opening when in the closed position, the second wall opening open when the second valving member is in the opened position.

9. The air conveyor segment of claim 8 wherein a portion of the first wall is disposed between the first and second wall openings, a first hinge and a second hinge mounted on the first wall portion, the first valving member connected to the first hinge, the second valving member attached to the second hinge, the first valving member spanning the first wall opening when in the closed position, the second valving member spanning the second wall opening when in the closed position.

10. The air conveyor segment of claim 9 wherein the valve assembly comprises one or more fluid cylinders, each fluid cylinder connected to both the first and second valving members to drive the first and second valving members between opened and closed positions, the first and second valving members moving simultaneously between opened and closed positions.

11. The air conveyor segment of claim 1 wherein one end of the lower air duct is closed.

12. The air conveyor segment of claim 11 wherein the other end of the lower air duct is closed.

13. The air conveyor segment of claim 1 comprising a second wall forming a portion of the lower air duct, the second wall comprising a channel extending from the first end to the second end, the openings in the lower air duct disposed in the channel, the channel having a hollow interior open to the ambient atmosphere, the openings in the channel fluidly communicating the interior of the channel with the lower air duct.

14. The air conveyor segment of claim 13 wherein the first wall includes a second wall opening and the valve assembly includes a second valving member pivotally attached to the first wall and being movable between opened and closed positions, the second valving member closing the second wall opening when in the closed position, the second wall opening being open when the second valving member is in the opened position, the channel centered between the first and second wall openings.

15. The air conveyor segment of claim 1 wherein the valve assembly is operatively connected to a control system that receives signals and automatically controls the positioning of the valving member in response to such signals.

16. The air conveyor segment of claim 15 wherein the control system is configured and adapted to adjust the speed of articles being conveyed along the air conveyor segment by selectively stopping the first valving member in an intermediate position between the opened and closed positions.

17. The air conveyor segment of claim 1 wherein the first end of the air conveyor segment is connected to a second end of an adjacent air conveyor segment.

18. The air conveyor segment of claim 17 wherein the upper air duct of the air conveyor segment is fluidly connected with the upper air duct of the adjacent air conveyor segment.

* * * * *